US011953091B2

(12) United States Patent
Miyazaki et al.

(10) Patent No.: US 11,953,091 B2
(45) Date of Patent: Apr. 9, 2024

(54) CONTROL DEVICE OF POWER TRANSMISSION DEVICE, POWER TRANSMISSION DEVICE, AND CONTROL METHOD FOR POWER TRANSMISSION DEVICE

(71) Applicant: KOMATSU LTD., Tokyo (JP)

(72) Inventors: Shogo Miyazaki, Tokyo (JP); Shinya Kawakita, Tokyo (JP); Kenichi Yamada, Tokyo (JP)

(73) Assignee: KOMATSU LTD., Tokyo (JP)

( * ) Notice: Subject to any disclaimer, the term of this patent is extended or adjusted under 35 U.S.C. 154(b) by 281 days.

(21) Appl. No.: 17/603,713

(22) PCT Filed: Jun. 8, 2020

(86) PCT No.: PCT/JP2020/022470
§ 371 (c)(1),
(2) Date: Oct. 14, 2021

(87) PCT Pub. No.: WO2020/250845
PCT Pub. Date: Dec. 17, 2020

(65) Prior Publication Data
US 2022/0196148 A1 Jun. 23, 2022

(30) Foreign Application Priority Data
Jun. 14, 2019 (JP) ................................. 2019-111524

(51) Int. Cl.
*F16H 61/475* (2010.01)
*F16H 61/00* (2006.01)
(Continued)

(52) U.S. Cl.
CPC ....... *F16H 61/475* (2013.01); *F16H 61/0021* (2013.01); *F16H 61/4017* (2013.01); *F16H 3/727* (2013.01)

(58) Field of Classification Search
CPC .............. F16H 61/475; F16H 61/0021; F16H 61/4017; F16H 61/472; F16H 47/04; F16H 3/727
See application file for complete search history.

(56) References Cited

U.S. PATENT DOCUMENTS 4,341,132 A    7/1982  Burdick
4,354,400 A *  10/1982 Baker ..................... F16H 47/04
                                                          475/74
(Continued)

FOREIGN PATENT DOCUMENTS

CN    101568751 A    10/2009
CN    105392654 A    3/2016
(Continued)

OTHER PUBLICATIONS

The International Search Report for the corresponding international application No. PCT/JP2020/022470, dated Aug. 18, 2020.

*Primary Examiner* — Sherry L Estremsky
(74) *Attorney, Agent, or Firm* — Global IP Counselors, LLP

(57) ABSTRACT

A power transmission device includes an input shaft, an output shaft, a differential device, a continuously variable transmission unit, and a control device. The differential device includes a first rotation element connected to the input shaft, a second rotation element connected to the output shaft, and a third rotation element. The continuously variable transmission unit includes a conversion unit configured to convert rotational power of the third rotation element into an other power, and a reconversion unit configured to reconvert the converted other power into the rotational power and supply the reconverted rotational power to the output shaft. The control device includes a continuously variable transmission control unit configured to generate a control signal of the continuously variable (Continued)

transmission unit such that the other power generated by the conversion unit exceeds the other power input to the reconversion unit.

8 Claims, 6 Drawing Sheets

(51) Int. Cl.
*F16H 61/4017* (2010.01)
*F16H 3/72* (2006.01)

(56) References Cited

U.S. PATENT DOCUMENTS

| | | | |
|---|---|---|---|
| 5,809,846 A * | 9/1998 | Ohkura | F16H 47/04 475/78 |
| 6,616,559 B1 | 9/2003 | Hori et al. | |
| 9,885,168 B2 * | 2/2018 | Miyamoto | F02D 29/06 |
| 10,377,222 B2 * | 8/2019 | Hoffmann | B60K 6/365 |
| 2009/0105028 A1 | 4/2009 | Hiraki et al. | |
| 2010/0029428 A1 | 2/2010 | Abe et al. | |
| 2010/0184551 A1 | 7/2010 | Hiraoka et al. | |
| 2016/0017570 A1 | 1/2016 | Miyamoto et al. | |
| 2016/0160470 A1 | 6/2016 | Kishimoto et al. | |
| 2016/0300405 A1 | 10/2016 | Asada et al. | |
| 2019/0161940 A1 | 5/2019 | Takeda et al. | |

FOREIGN PATENT DOCUMENTS

| | | |
|---|---|---|
| CN | 107076288 A | 8/2017 |
| EP | 3 211 272 A1 | 8/2017 |
| JP | 9-177932 A | 7/1997 |
| JP | 3374321 B2 | 11/2002 |
| JP | 2006-329244 A | 12/2006 |
| JP | 4310362 B2 | 5/2009 |
| JP | 2009-127826 A | 6/2009 |
| JP | 2013-24301 A | 2/2013 |
| JP | 2015-96401 A | 5/2015 |
| JP | 2018-53539 A | 4/2018 |
| JP | 2019-49291 A | 3/2019 |
| KR | 10-2015-0026474 A | 3/2015 |

* cited by examiner

CONTROL DEVICE OF POWER TRANSMISSION DEVICE, POWER TRANSMISSION DEVICE, AND CONTROL METHOD FOR POWER TRANSMISSION DEVICE

CROSS-REFERENCE TO RELATED APPLICATIONS

This application is a U.S. National stage application of International Application No. PCT/JP2020/022470, filed on Jun. 8, 2020. This U.S. National stage application claims priority under 35 U.S.C. § 119(a) to Japanese Patent Application No. 2019-111524, filed in Japan on Jun. 14, 2019, the entire contents of which are hereby incorporated herein by reference.

BACKGROUND

Field of the Invention

The present disclosure relates to a control device of a power transmission device, a power transmission device, and a control method for a power transmission device.

Background Information

A composite power transmission device such as a hydraulic mechanical transmission (HMT), which combines transmission by mechanical power and transmission by hydraulic power, or an electric mechanical transmission (EMT), which combines transmission by mechanical power and transmission by electric power, is known. As compared to a continuously variable transmission such as a hydraulic static transmission (HST), in the composite power transmission device, a hydraulic power device or an electric power device can be miniaturized by an added amount of mechanical power, and the power transmission efficiency is also high.

On the other hand, in the composite power transmission device, when a rotation speed of an output shaft is small at the time of a stall, the power transmission due to the mechanical power is small. In such a situation, the composite power transmission device in which the hydraulic power device or the electric power device is miniaturized in consideration of the added amount of mechanical power cannot exert a large traction force. Japanese Unexamined Patent Application, First Publication No. 2006-329244 discloses a technique provided with an assist motor in order to increase traction force when mechanical power is small at the time of a stall.

SUMMARY

An object of the present disclosure is to provide a control device of a power transmission device, a power transmission device, and a control method for a power transmission device, which enable a composite power transmission device to exert a high traction force.

An aspect of the present disclosure relates to a control device of a power transmission device that includes an input shaft, an output shaft, a differential device including a first rotation element connected to the input shaft, a second rotation element connected to the output shaft, and a third rotation element, and a continuously variable transmission unit including a conversion unit configured to convert rotational power of the third rotation element into another power and a reconversion unit configured to reconvert the converted other power into the rotational power and supply the reconverted rotational power to the output shaft, the control device including a continuously variable transmission control unit configured to generate a control signal of the continuously variable transmission unit such that the other power generated by the conversion unit exceeds the other power input to the reconversion unit.

According to the aspect described above, the control device of the power transmission device enables the composite power transmission device to exert a high traction force.

DETAILED DESCRIPTION OF EMBODIMENT(S)

First Embodiment (Configuration of Work Vehicle)

Embodiments will be described below in detail with reference to the drawings.

Figure 1:
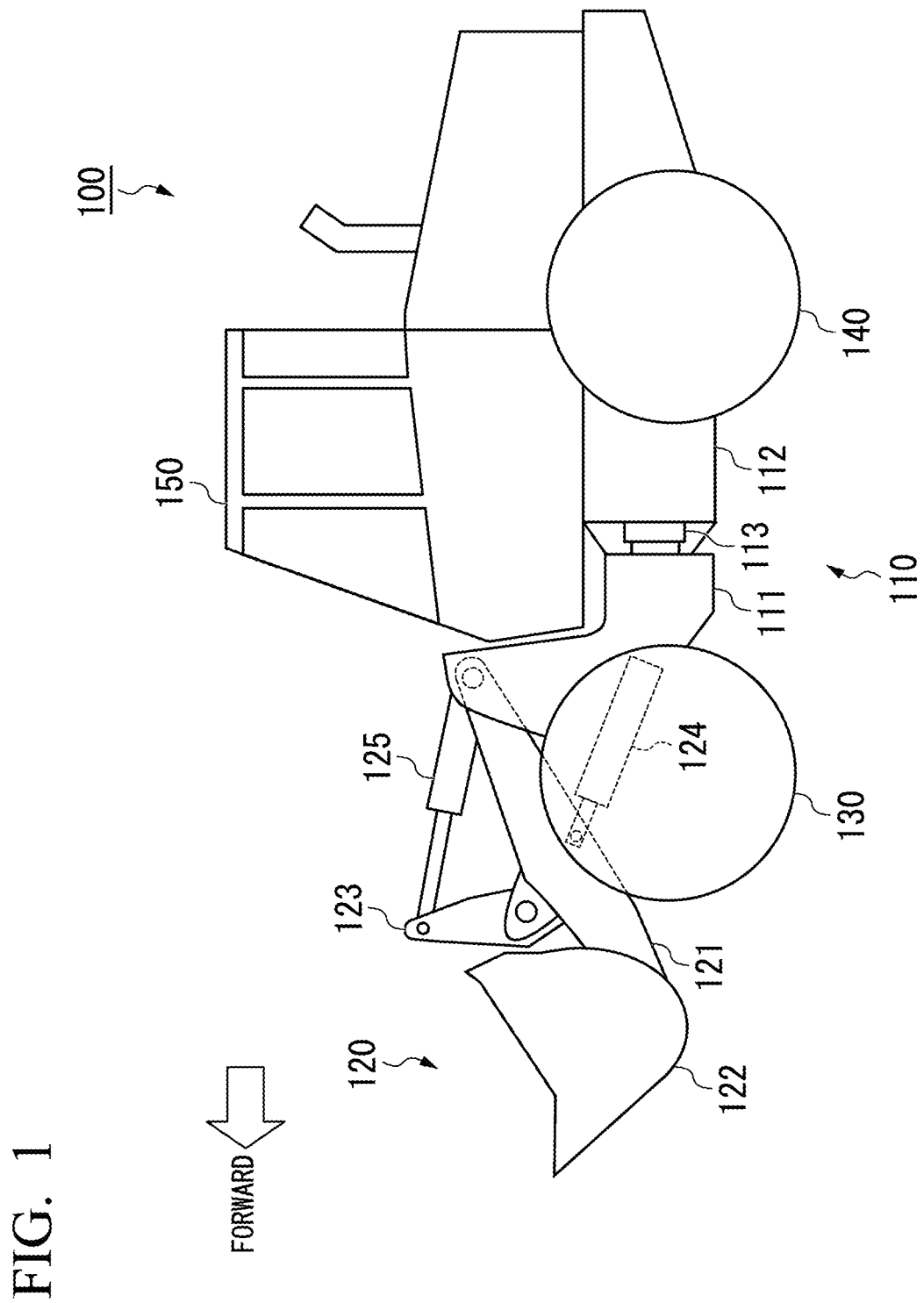
FIG. 1 is a side view of a work vehicle according to a first embodiment.

FIG. 1 is a side view of a work vehicle according to a first embodiment.

A work vehicle 100 according to the first embodiment is a wheel loader. The work vehicle 100 includes a vehicle body 110, a work equipment 120, a front wheel portion 130, a rear wheel portion 140, and a cab 150. The work vehicle 100 is an example of a power machine.

The vehicle body 110 includes a front vehicle body 111, a rear vehicle body 112, and a steering cylinder 113. The front vehicle body 111 and the rear vehicle body 112 are rotatably attached around a steering axis extending in a vertical direction of the vehicle body 110. The front wheel portion 130 is provided in a lower portion of the front vehicle body 111, and the rear wheel portion 140 is provided in a lower portion of the rear vehicle body 112.

The steering cylinder 113 is a hydraulic cylinder. A base end portion of the steering cylinder 113 is attached to the rear vehicle body 112, and a distal end portion thereof is attached to the front vehicle body 111. The steering cylinder 113 expands and contracts by hydraulic oil to define an angle between the front vehicle body 111 and the rear vehicle body 112. That is, a steering angle of the front wheel portion 130 is defined by the expansion and contraction of the steering cylinder 113.

The work equipment 120 is used for excavating and transporting a work object such as earth. The work equipment 120 is provided in a front portion of the vehicle body 110. The work equipment 120 includes a boom 121, a bucket 122, a bell crank 123, a lift cylinder 124, and a bucket cylinder 125.

A base end portion of the boom 121 is attached to the front portion of the front vehicle body 111 via a pin.

The bucket 122 includes a blade which excavates the work object and a container which transports the excavated work object. A base end portion of the bucket 122 is attached to a distal end portion of the boom 121 via a pin.

The bell crank 123 transmits power of the bucket cylinder 125 to the bucket 122. A first end of the bell crank 123 is attached to a bottom portion of the bucket 122 via a link mechanism. A second end of the bell crank 123 is attached to a distal end portion of the bucket cylinder 125 via a pin.

The lift cylinder 124 is a hydraulic cylinder. A base end portion of the lift cylinder 124 is attached to the front portion of the front vehicle body 111. A distal end portion of the lift cylinder 124 is attached to the boom 121. The lift cylinder 124 expands and contracts by the hydraulic oil, so that the boom 121 is driven in an upward direction or a downward direction.

The bucket cylinder 125 is a hydraulic cylinder. A base end portion of the bucket cylinder 125 is attached to the front portion of the front vehicle body 111. A distal end portion of the bucket cylinder 125 is attached to the bucket 122 via the bell crank 123. The bucket cylinder 125 expands and contracts by the hydraulic oil, so that the bucket 122 swings in a tilt direction or a dump direction.

(Configuration of Cab)

The cab 150 is a space in which an operator gets on and performs an operation of the work vehicle 100. The cab 150 is provided in an upper portion of the rear vehicle body 112.

Figure 2:
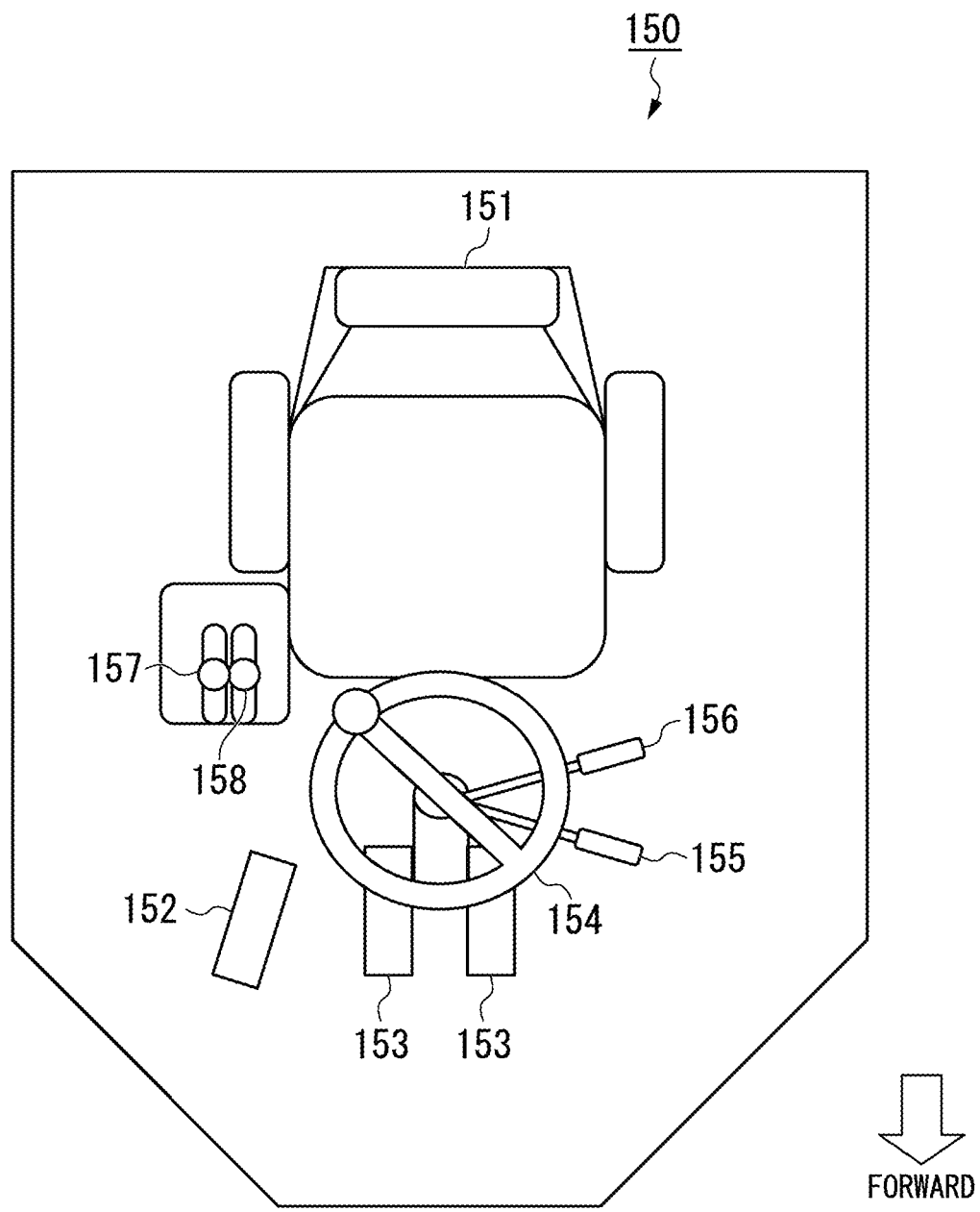
FIG. 2 is a view showing an internal configuration of a cab according to the first embodiment.

FIG. 2 is a view showing an internal configuration of the cab according to the first embodiment. A seat 151, an accelerator pedal 152, a brake pedal 153, a steering wheel 154, a front/rear selector switch 155, a shift switch 156, a boom lever 157, and a bucket lever 158 are provided inside the cab 150.

The accelerator pedal 152 is operated to set traveling driving force (traction force) generated to the work vehicle 100. As an operation amount of the accelerator pedal 152 is larger, target driving force (target traction force) is set higher.

The brake pedal 153 is operated to set traveling braking force generated to the work vehicle 100. As an operation amount of the brake pedal 153 is larger, the braking force is set higher.

The steering wheel 154 is operated to set the steering angle of the work vehicle 100.

The front/rear selector switch 155 is operated to set a traveling direction of the work vehicle 100. The traveling direction of the work vehicle is any of forward (F), rear (R), or neutral (N).

The shift switch 156 is operated to set a speed range of a power transmission device. By operating the shift switch 156, for example, one speed range is selected from a first gear, a second gear, a third gear, and a fourth gear.

The boom lever 157 is operated to set a movement amount of a raising operation or a lowering operation of the boom 121. The boom lever 157 accepts the lowering operation by being tilted forward and accepts the raising operation by being tilted backward.

The bucket lever 158 is operated to set a movement amount of a dump operation or a tilt operation of the bucket 122. The bucket lever 158 accepts the dump operation by being tilted forward and accepts the tilt operation by being tilted backward.

(Configuration of Power System)

Figure 3:
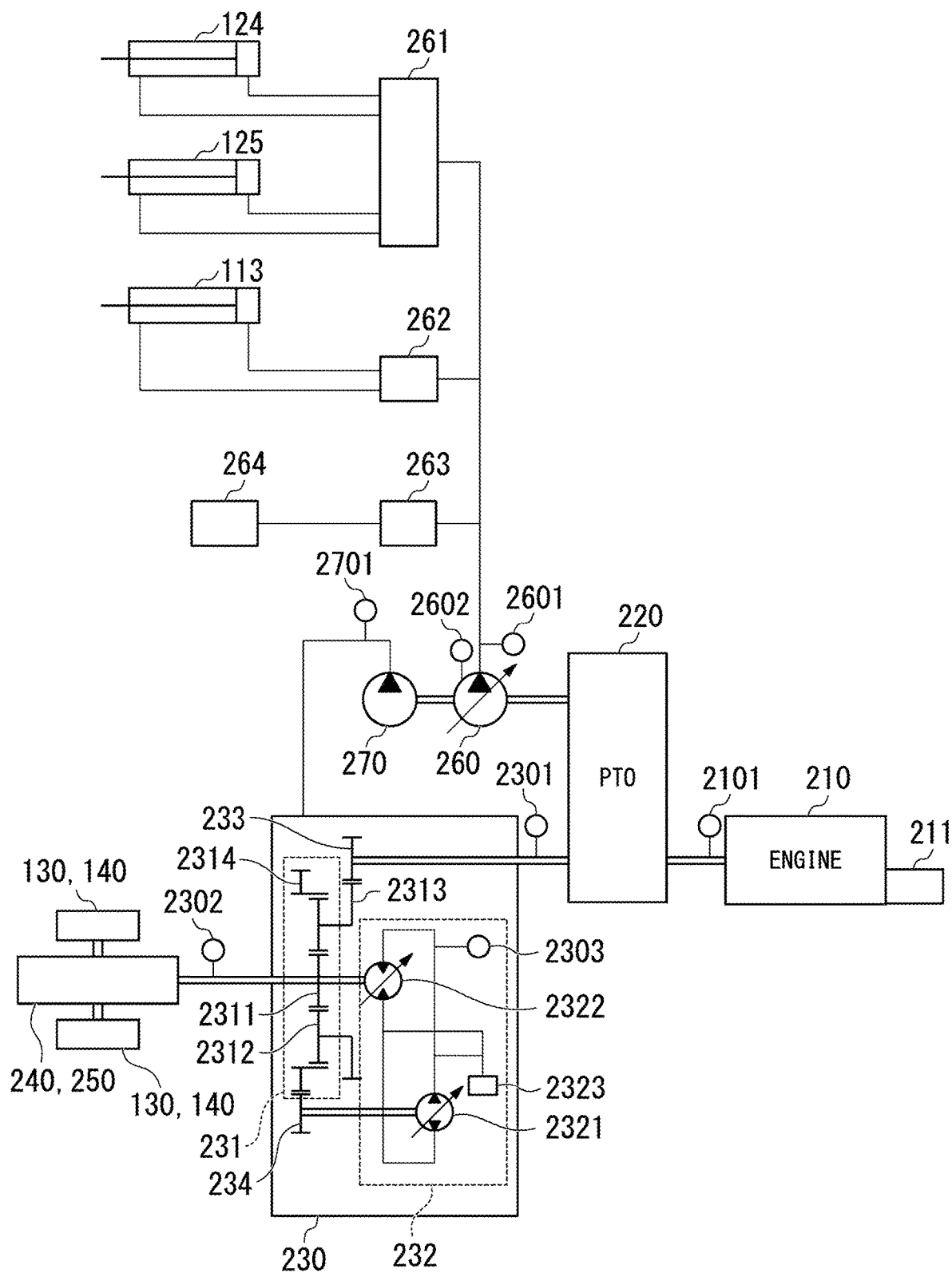
FIG. 3 is a schematic diagram showing a power system of the work vehicle according to the first embodiment.

FIG. 3 is a schematic diagram showing a power system of the work vehicle according to the first embodiment.

The work vehicle 100 includes an engine 210, a power take off (PTO) 220, a hydraulic mechanical transmission (HMT) 230, a front axle 240, a rear axle 250, a variable capacity pump 260, and a fixed capacity pump 270.

The engine 210 is a diesel engine, for example. A fuel injection device 211 and an engine tachometer 2101 are provided in the engine 210. The fuel injection device 211 controls the driving force of the engine 210 by adjusting an injection amount of fuel into a cylinder of the engine 210. The engine tachometer 2101 measures a rotation speed of the engine 210.

The PTO 220 transmits part of the driving force of the engine 210 to the variable capacity pump 260 and the fixed capacity pump 270. That is, the PTO 220 distributes the driving force of the engine 210 to the HMT 230, the variable capacity pump 260, and the fixed capacity pump 270.

The HMT 230 is a power transmission device which controls gear shifting by combining a planetary gear mechanism 231 and a hydraulic static transmission (HST) 232. The HMT 230 shifts the driving force input to an input shaft and outputs the shifted driving force from an output shaft. The input shaft of the HMT 230 is connected to the PTO 220, and the output shaft thereof is connected to the front axle 240 and the rear axle 250. That is, the HMT 230 transmits the driving force of the engine 210 distributed by the PTO 220 to the front axle 240 and the rear axle 250.

An input shaft tachometer 2301 and an output shaft tachometer 2302 are provided in the HMT 230. The input shaft tachometer 2301 measures a rotation speed of the input shaft of the HMT 230. The output shaft tachometer 2302 measures a rotation speed of the output shaft of the HMT 230. An HST pressure gauge 2303 is provided in the HST 232 of the HMT 230. The HST pressure gauge 2303 measures a pressure of the HST 232.

The front axle 240 transmits the driving force output by the HMT 230 to the front wheel portion 130. As a result, the front wheel portion 130 is rotated.

The rear axle 250 transmits the driving force output by the HMT 230 to the rear wheel portion 140. As a result, the rear wheel portion 140 is rotated.

The front axle 240 and the rear axle 250 are examples of a traveling device.

The variable capacity pump 260 is driven by the driving force from the engine 210. A discharge capacity of the variable capacity pump 260 is changed, for example, by controlling a tilt angle of a swash plate provided in the variable capacity pump 260. The hydraulic oil discharged from the variable capacity pump 260 is supplied to the lift cylinder 124 and the bucket cylinder 125 via a control valve 261 and is supplied to the steering cylinder 113 via a steering valve 262. In addition, the hydraulic oil discharged from the variable capacity pump 260 is discharged from a relief valve 264 via a PTO brake valve 263.

The control valve 261 controls a flow rate of the hydraulic oil discharged from the variable capacity pump 260 and distributes the hydraulic oil to the lift cylinder 124 and the bucket cylinder 125. The steering valve 262 controls a flow rate of the hydraulic oil supplied to the steering cylinder 113. The PTO brake valve 263 controls a flow rate of the hydraulic oil supplied to the relief valve 264. When the pressure of the hydraulic oil exceeds a predetermined relief pressure, the relief valve 264 releases the pressure, and discharges the hydraulic oil.

A first pump pressure gauge 2601 and a pump capacity meter 2602 are provided in the variable capacity pump 260. The first pump pressure gauge 2601 measures a discharge pressure of the hydraulic oil from the variable capacity pump 260. The pump capacity meter 2602 measures a capacity of the variable capacity pump 260 based on an angle of the swash plate of the variable capacity pump 260 and the like.

The variable capacity pump 260 is an example of a device to which the power is distributed from the PTO 220. In another embodiment, the variable capacity pump 260 may be configured by a plurality of pumps or may have another supply destination such as a hydraulically driven fan (not shown) in place of or in addition to the variable capacity pump 260.

The fixed capacity pump 270 is driven by the driving force from the engine 210. The hydraulic oil discharged from the fixed capacity pump 270 is supplied to a clutch (not shown) in the HMT 230. A second pump pressure gauge 2701 is provided in the fixed capacity pump 270. The second pump pressure gauge 2701 measures a discharge pressure of the hydraulic oil from the fixed capacity pump 270. The fixed capacity pump 270 is an example of the device to which the power is distributed from the PTO 220. The fixed capacity pump 270 may be configured by a plurality of pumps or may have a supply destination such as a lubrication circuit (not shown).

(Configuration of HMT)

The HMT 230 includes the planetary gear mechanism 231, the HST 232, an input shaft gear 233, and an HST pump shaft gear 234.

The input shaft gear 233 is a gear which transmits the driving force of the engine 210 to the planetary gear mechanism 231. The input shaft gear 233 is connected to the input shaft of the HMT 230. The input shaft gear 233 is engraved with teeth which is capable of being fitted to a carrier 2313 of the planetary gear mechanism 231.

The HST pump shaft gear 234 is a gear which transmits the power of the planetary gear mechanism 231 to the HST pump 2321. The HST pump shaft gear 234 is connected to the input shaft of the HST 232. The HST pump shaft gear 234 is engraved with teeth which is capable of being fitted to an outer circumference of a ring gear 2314.

The planetary gear mechanism 231 includes a sun gear 2311, a plurality of planetary gears 2312, the carrier 2313, and the ring gear 2314. The sun gear 2311, the carrier 2313, and the ring gear 2314 are rotation elements of the planetary gear mechanism 231. Note that the planetary gear mechanism 231 is an example of a differential device.

The sun gear 2311 is a gear disposed at the center of the planetary gear mechanism 231. The output shaft of the HMT 230 is connected to a rotation shaft of the sun gear 2311. An outer circumference of the sun gear 2311 is engraved with teeth which is capable of being fitted to the planetary gear 2312.

The planetary gear 2312 is a gear fitted to the outer circumference of the sun gear 2311. An outer circumference of the planetary gear 2312 is engraved with teeth which is capable of being fitted to the sun gear 2311 and the ring gear 2314.

The carrier 2313 rotatably supports central axes of the plurality of planetary gears 2312. The carrier 2313 is rotated as the planetary gear 2312 is moved. An outer circumference of the carrier 2313 is engraved with teeth which is capable of being fitted to the input shaft gear 233.

The ring gear 2314 is a gear in which teeth on an inner circumference thereof are fitted to the outer circumferences of the plurality of planetary gears 2312. The inner circumference of the ring gear 2314 is engraved with teeth which is capable of being fitted to the planetary gear 2312. The outer circumference of the ring gear 2314 is engraved with teeth which is capable of being fitted to the HST pump shaft gear 234, and the teeth on the outer circumference thereof are fitted to the HST pump shaft gear 234. Note that a configuration of the planetary gear mechanism 231 or a connection relationship between the planetary gear mechanism 231 and each component are examples and are not limited thereto in another embodiment.

The HST 232 includes an HST pump 2321, an HST motor 2322, and an HST relief valve 2323. The HST 232 is an example of a continuously variable transmission unit.

The HST pump 2321 is driven by power transmitted from the carrier 2313 to the ring gear 2314 of the planetary gear mechanism 231 and from the ring gear 2314 to the HST pump shaft gear 234. The HST pump 2321 supplies the hydraulic oil to the HST motor 2322. That is, the HST pump 2321 is an example of a conversion unit which converts rotational power into hydraulic power.

The HST motor 2322 is driven by the hydraulic oil supplied from the HST pump 2321. The HST motor 2322 provides the power to the sun gear 2311. That is, the HST motor 2322 is an example of a reconversion unit which reconverts the hydraulic power into the rotational power.

The HST relief valve 2323 is connected to a hydraulic circuit that connects the HST pump 2321 and the HST motor 2322, releases the pressure when the pressure of the hydraulic oil exceeds the predetermined relief pressure, and discharges the hydraulic oil.

The HMT 230 according to the first embodiment has an input division type configuration. That is, the power of the engine 210, which is input to the HMT 230, is divided into the sun gear 2311 and the ring gear 2314 by the planetary gear mechanism 231. The power divided into the sun gear 2311 is directly transmitted to the output shaft, as mechanical power. The HST 232 is driven by the power of the ring gear 2314, and the power of the HST 232 is provided to the sun gear 2311. That is, the HST pump 2321 is driven by the mechanical power divided into the ring gear 2314, so that the mechanical power is converted into the hydraulic power, and the hydraulic power is reconverted into the mechanical power by the HST motor 2322 and transmitted to the output shaft. As a result, the HMT 230 adds the hydraulic power of the HST 232 to the mechanical power transmitted by the planetary gear mechanism 231, and thus can add the mechanical power to the hydraulic power of the HST 232. Note that a configuration of the HMT 230 or a connection relationship between the HMT 230 and each component are examples and are not limited thereto in another embodiment.

(Control Device)

The work vehicle 100 includes a control device 300 that controls the work vehicle 100.

The control device 300 outputs control signals to the fuel injection device 211, the HMT 230, the variable capacity pump 260, the control valve 261, and the PTO brake valve 263, in response to the operation amount of each operation device (the accelerator pedal 152, the brake pedal 153, the steering wheel 154, the front/rear selector switch 155, the shift switch 156, the boom lever 157, and the bucket lever 158) in the cab 150.

In addition, the control device 300 performs torque assist control of increasing output torque of the HMT 230 by positively relieving the HST 232 when the rotation speed of the output shaft is small as at the time of a stall. Hereinafter, the reason why the output torque of the HMT 230 is increased by positively relieving the HST 232 will be described.

When an internal pressure of the HST 232 exceeds the relief pressure of the HST relief valve 2323, the hydraulic oil is discharged from the HST relief valve 2323. At this time, even though the hydraulic oil is discharged from the HST relief valve 2323, when the flow rate of the HST pump 2321 is further increased, the torque of the input shaft of the HST pump 2321 is increased. As the torque of the input shaft is increased, the input torque of the planetary gear mechanism 231 is increased. As a result, it is possible to increase the torque of the output shaft of the HMT 230 connected to the planetary gear mechanism 231.

Figure 4:
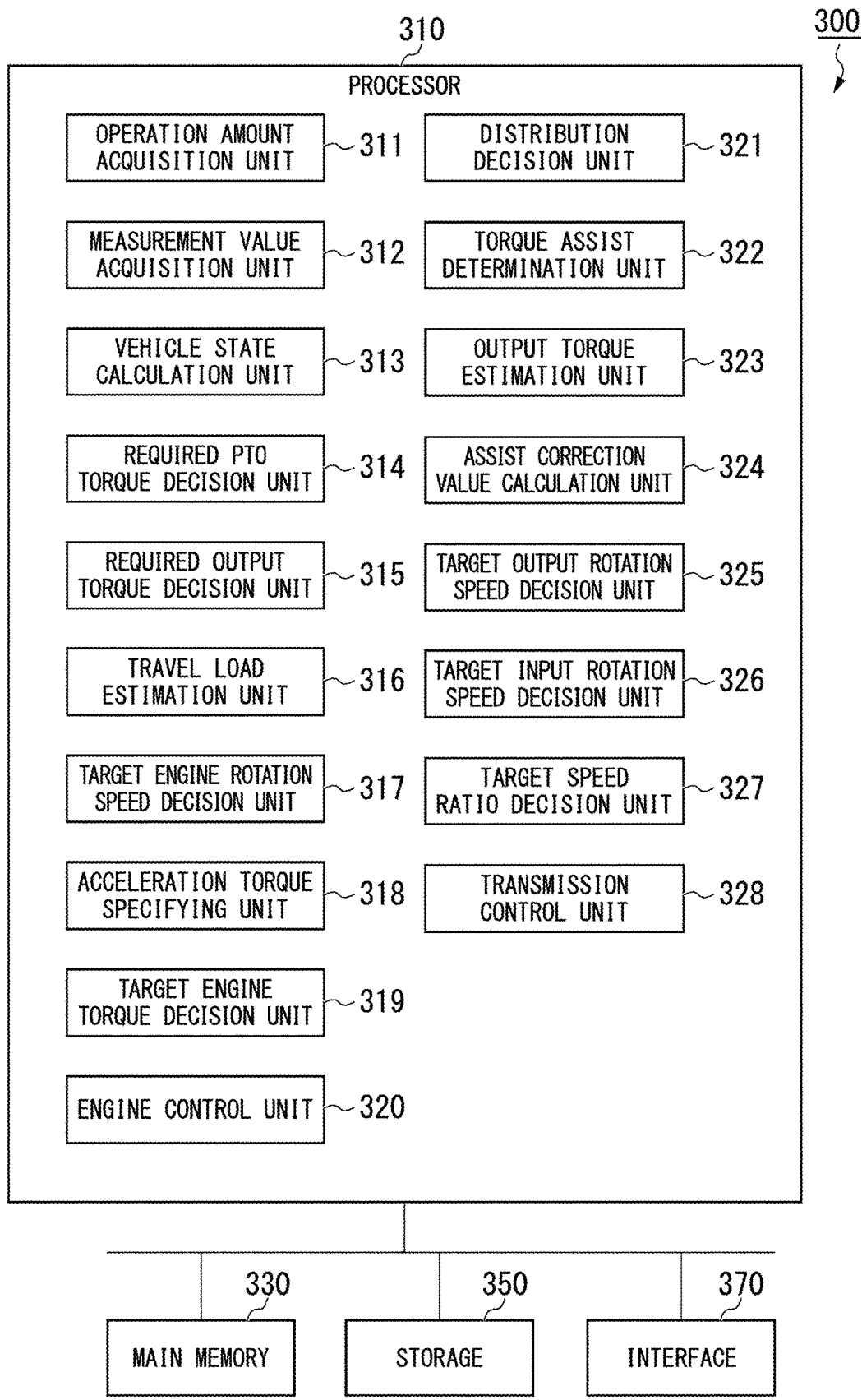
FIG. 4 is a schematic block diagram showing a configuration of a control device of the work vehicle according to the first embodiment.

FIG. 4 is a schematic block diagram showing a configuration of the control device of the work vehicle according to the first embodiment. The control device 300 is a computer which includes a processor 310, a main memory 330, a storage 350, and an interface 370.

The storage 350 is a non-transitory tangible storage medium. A hard disk drive (HDD), a solid state drive (SSD), a magnetic disk, an optical magnetic disk, a compact disc read only memory (CD-ROM), a digital versatile disc read only memory (DVD-ROM), a semiconductor memory, and the like are exemplary examples of the storage 350. The storage 350 may be an internal medium directly connected to a bus of the control device 300, or an external medium connected to the control device 300 via the interface 370 or a communication line. The storage 350 stores a program for controlling the work vehicle 100.

The program may be a program for realizing a part of the functions exerted by the control device 300. For example, the program may exert the functions in combination with another program already stored in the storage 350, or in combination with another program mounted on another device. Note that in another embodiment, the control device 300 may include a custom large scale integrated circuit (LSI) such as a programmable logic device (PLD) in addition to or in place of the configuration described above. A programmable array logic (PAL), a generic array logic (GAL), a complex programmable logic device (CPLD), and a field programmable gate array (FPGA) are exemplary examples of the PLD. In this case, part or all of the functions realized by the processor 310 may be realized by an integrated circuit.

In a case in which the program is distributed to the control device 300 by the communication line, the control device 300, which receives the distribution, may load the program in the main memory 330 and execute the process described above.

In addition, the program may be a program for realizing part of the functions described above. Further, the program may be a so-called difference file (difference program) which realizes the functions described above in combination with another program already stored in the storage 350.

By executing the program, the processor 310 includes an operation amount acquisition unit 311, a measurement value acquisition unit 312, a vehicle state calculation unit 313, a required PTO torque decision unit 314, a required output torque decision unit 315, a travel load estimation unit 316, a target engine rotation speed decision unit 317, an acceleration torque specifying unit 318, a target engine torque decision unit 319, an engine control unit 320, a distribution decision unit 321, a torque assist determination unit 322, an output torque estimation unit 323, an assist correction value calculation unit 324, a target output rotation speed decision unit 325, a target input rotation speed decision unit 326, a target speed ratio decision unit 327, and a transmission control unit 328.

The operation amount acquisition unit 311 acquires the operation amount from each of the accelerator pedal 152, the brake pedal 153, the steering wheel 154, the front/rear selector switch 155, the shift switch 156, the boom lever 157, and the bucket lever 158. Hereinafter, the operation amount of the accelerator pedal 152 is referred to as an accelerator operation amount, the operation amount of the brake pedal 153 is referred to as a brake operation amount, the operation amount of the steering wheel 154 is referred to as a steering operation amount, a value in response to an operation position of the front/rear selector switch 155 is referred to as an FNR operation amount, a value in response to an operation position of the shift switch 156 is referred to as a shift operation amount, the operation amount of the boom lever 157 is referred to as a boom operation amount, and the operation amount of the bucket lever 158 is referred to as a bucket operation amount.

The measurement value acquisition unit 312 acquires the measurement values from the fuel injection device 211, the engine tachometer 2101, the input shaft tachometer 2301, the output shaft tachometer 2302, the HST pressure gauge 2303, the first pump pressure gauge 2601, the pump capacity meter 2602, and the second pump pressure gauge 2701. That is, the measurement value acquisition unit 312 acquires the measurement value of each of a fuel injection amount of the engine 210, the rotation speed of the engine 210, the rotation speed of the input shaft of the HMT 230, the rotation speed of the output shaft of the HMT 230, the pressure of the HST 232, a pump pressure of the variable capacity pump 260, the capacity of the variable capacity pump 260, and a pump pressure of the fixed capacity pump 270.

The vehicle state calculation unit 313 calculates the output torque of the engine 210, upper limit torque of the engine 210, angular acceleration of the engine 210, torque (PTO torque) distributed by the PTO 220 to the variable capacity pump 260 and the fixed capacity pump 270, an input-output speed ratio of the HMT 230, angular acceleration of the output shaft of the HMT 230, and a traveling speed of the work vehicle 100, based on the measurement value acquired by the measurement value acquisition unit 312. The output torque of the engine 210 is the torque that the engine 210 can actually exert, which is calculated based on the fuel injection amount. The upper limit torque of the engine 210 is the maximum torque that the engine 210 is capable of exerting.

The required PTO torque decision unit 314 decides a required value of the torque (required PTO torque) distributed from the PTO 220 to the variable capacity pump 260 and the fixed capacity pump 270, based on the steering operation amount, the boom operation amount, and the bucket operation amount acquired by the operation amount acquisition unit 311 and the measurement values of the pump pressure of the variable capacity pump 260, the capacity of the variable capacity pump 260, the pump pressure of the fixed capacity pump 270 acquired by the measurement value acquisition unit 312. For example, the required PTO torque decision unit 314 obtains the required flow rate of the variable capacity pump 260 from the steering operation amount based on a PTO conversion function that defines the relationship between the operation amount and the required flow rate. In addition, for example, the required PTO torque decision unit 314 obtains a required flow rate of the variable capacity pump 260 from the boom operation amount and the bucket operation amount based on the PTO conversion function. Then, the required PTO torque decision unit 314 decides the required PTO torque based on the measurement values of the pump pressure of the variable capacity pump 260, the capacity of the variable capacity pump 260, the pump pressure of the fixed capacity pump 270, and the specified required flow rate of the variable capacity pump 260.

The required output torque decision unit 315 decides a required value of the torque (required output torque) of the output shaft of the HMT 230 based on the accelerator operation amount, the brake operation amount, the shift operation amount, and the FNR operation amount acquired by the operation amount acquisition unit 311 and the traveling speed calculated by the vehicle state calculation unit 313. For example, the required output torque decision unit 315 decides the required output torque from the traveling speed calculated by the vehicle state calculation unit 313 based on a traveling conversion function that defines a relationship between the traveling speed and the required output torque. At this time, the required output torque decision unit 315 decides a characteristic of a traveling conversion function based on the accelerator operation amount, the brake operation amount, the shift operation amount, and the FNR operation amount.

Specifically, the required output torque decision unit 315 specifies a traveling conversion function corresponding to the speed range specified by the shift operation amount among a plurality of the traveling conversion functions corresponding to a plurality of the speed ranges. In a case in which there is the accelerator operation, the required output torque decision unit 315 transforms the specified traveling conversion function based on a magnification related to the accelerator operation amount. In a case in which there is a brake operation, the required output torque decision unit 315 transforms the specified traveling conversion function based on a magnification related to the brake operation amount. The required output torque decision unit 315 decides a sign of the required output torque based on the FNR operation amount. Note that in a case in which the signs of the required output torque and the traveling speed do not match (a case in which a sign of the product of the required output torque and the traveling speed is negative), the torque on a braking side is exerted by the HMT 230.

With the traveling conversion function, when the traveling speed exceeds a predetermined speed, the required output torque is a value on the braking side. Therefore, in the required output torque decision unit 315, in a case in which the traveling speed calculated by the vehicle state calculation unit 313 exceeds an upper limit of the speed range specified by the shift operation amount, the accelerator operation amount, and the brake operation amount, the required output torque is a value on the braking side (sign opposite to the traveling speed).

The travel load estimation unit 316 estimates traveling load torque $T_{load}$ related to traveling based on output torque $T_{eng}$ of the engine 210, angular acceleration $\alpha_{eng}$ of the engine 210, PTO torque $T_{PTO}$, an input-output speed ratio i of the HMT 230, and angular acceleration $\alpha_{out}$ of the output shaft of the HMT 230 calculated by the vehicle state calculation unit 313.

The traveling load torque $T_{load}$ can be calculated based on the following expression (1).

(Expression 1)

$$T_{load} = \frac{\eta_t}{i} N(T_{eng} - T_{PTO} - I_{eng}\alpha_{eng}) - \frac{I_v}{N}\alpha_{out} \quad (1)$$

$I_{eng}$ is the moment of inertia of the engine 210. Iv is the moment of inertia of the work vehicle 100. $\eta_t$ is the torque efficiency of the HMT 230. N is an axle reduction ratio between the output shaft of the HMT 230 and the front wheel portion 130 and the rear wheel portion 140. The moment of inertia $I_{eng}$, the moment of inertia Iv, the torque efficiency $\eta_t$, and the axle reduction ratio N are constants.

Note that the expression (1) can be derived from an expression (2) indicating a relationship between the output torque $T_{eng}$ of the engine 210 and the output torque $T_{out}$ of the HMT 230 and an expression (3) indicating a relationship between the output torque $T_{out}$ of the HMT 230 and the acceleration $\alpha_{out}$ of the work vehicle 100. Note that in another embodiment, the traveling load torque $T_{load}$ may be calculated based on an expression other than the expression (1). For example, in place of the expression (2), an expression specifying the traveling load torque $T_{load}$ may be derived by using an expression indicating a relationship between the pressure of the HST 232 measured by the HST 232, a capacity command of the variable capacity pump of the HST 232 or the pump capacity measured by the pump capacity meter provided in the variable capacity pump, and the output torque $T_{out}$. In addition, in another embodiment, in a case in which an electric motor is provided in the HMT 230, an expression specifying the traveling load torque $T_{load}$ may be derived by using a torque command of the electric motor or electric motor output torque estimated from the voltage/current.

(Expression 2)

$$T_{out} = \frac{\eta_t}{i}(T_{eng} - T_{PTO} - I_{eng}\alpha_{eng}) \quad (2)$$

(Expression 3)

$$I_v \frac{1}{N}\alpha_{out} = NT_{out} - T_{load} \quad (3)$$

The target engine rotation speed decision unit 317 decides a target engine rotation speed used for controlling the engine 210 based on a required traveling power calculated from the required output torque and the traveling speed and a required engine output, which is a sum of the required PTO torque and a required PTO output calculated from the measurement value of the rotation speed of the engine 210. The target engine rotation speed decision unit 317 decides the target engine rotation speed based on a rotation speed conversion function that defines a relationship between the required engine output and the engine rotation speed, which is determined in advance by design or the like. The rotation speed conversion function may be designed to suppress the rotation of the engine 210 to a low rotation speed side as much as possible within a range in which the required engine output is capable of being exerted and the engine acceleration is not inhibited.

In addition, the target engine rotation speed decision unit 317 decides the engine rotation speed (PTO required rotation speed) required to realize the required flow rate of the variable capacity pump 260, which is calculated by the required PTO torque decision unit 314. The target engine rotation speed decision unit 317 decides the PTO required rotation speed based on a rotation speed conversion function that defines a relationship between the required flow rate of the variable capacity pump 260 and the engine rotation speed, which is determined in advance by design or the like.

In a case where the target engine rotation speed is less than the PTO required rotation speed, the target engine rotation speed decision unit 317 decides the target engine rotation speed as the PTO required rotation speed.

The acceleration torque specifying unit 318 calculates target acceleration torque required to rotate the engine 210 at the target engine rotation speed based on the measurement value of the rotation speed of the engine 210 acquired by the measurement value acquisition unit 312 and the target engine rotation speed decided by the target engine rotation speed decision unit 317. That is, the acceleration torque specifying unit 318 decides target engine acceleration from a difference between the measurement value of the rotation speed of the engine 210 and the target engine rotation speed and multiplies the target engine acceleration by the moment of inertia of the engine 210 to calculate the target acceleration torque.

The target engine torque decision unit 319 decides target engine torque, which is the torque to be output by the engine 210, based on the PTO torque, the upper limit torque of the engine 210, and the input-output speed ratio of the HMT 230 calculated by the vehicle state calculation unit 313, the required output torque decided by the required output torque decision unit 315, and the measurement value of the rotation speed of the engine 210. The target engine torque decision unit 319 calculates required input torque, which is the torque of the engine 210 required to obtain the required output torque, by multiplying the required output torque by the input-output speed ratio of the HMT 230. The target engine torque decision unit 319 decides a smaller value out of the sum of the PTO torque and the required input torque and the maximum value of the engine torque, as the target engine torque.

The engine control unit 320 outputs an engine torque command to the fuel injection device 211. Specifically, the engine control unit 320 outputs the engine torque command indicating the target engine torque decided by the target engine torque decision unit 319. The engine control unit 320 is an example of a drive source control unit.

The distribution decision unit 321 decides the torque distributed to the variable capacity pump 260 and the fixed capacity pump 270 from the target engine torque via the PTO 220 and torque distributed to the HMT 230 from the target engine torque via the PTO 220, based on the required PTO torque decided by the required PTO torque decision unit 314 and the required output torque decided by the required output torque decision unit 315. Hereinafter, the torque distributed to the variable capacity pump 260 and the fixed capacity pump 270 from the target engine torque via the PTO 220 is referred to as target PTO torque, and the torque distributed to the input shaft of the HMT 230 from the target engine torque via the PTO 220 is referred to as target HMT torque.

For example, the distribution decision unit 321 decides the target PTO torque and the target HMT torque by distributing the torque obtained by subtracting the target acceleration torque from the target engine torque, based on a ratio of the required PTO torque and the required output torque. At this time, the distribution decision unit 321 may decide the target PTO torque and the target HMT torque after securing the minimum guaranteed values of the PTO torque and HMT torque. In addition, the distribution decision unit 321 calculates target output torque, which is a target value of the torque of the output shaft of the HMT 230, based on the target HMT torque, the input-output speed ratio of the HMT 230, and the efficiency of the HMT 230.

The torque assist determination unit 322 determines whether or not to perform torque assist using the output torque increase characteristic due to the relief of the HST 232 based on the target output torque decided by the distribution decision unit 321. Specifically, the torque assist determination unit 322 determines to perform the torque assist in a case in which the target output torque of the HMT 230 is larger than the maximum output torque of the HMT 230 obtained when the HST 232 is not relieved.

The output torque estimation unit 323 calculates an estimation value of the output torque (estimation output torque) of the HMT 230 based on the pressure of the HST 232 acquired by the measurement value acquisition unit 312, the output torque of the engine 210 calculated by the vehicle state calculation unit 313, and the capacity command of the HST motor 2322 recently output by the transmission control unit 328. Specifically, the output torque estimation unit 323 first calculates the torque of the HST motor 2322 from the pressure of the HST 232 and the capacity command of the HST motor 2322. Then, the output torque estimation unit 323 calculates the estimation output torque of the HMT 230 by substituting the torque of the HST motor 2322 and the output torque of the engine 210 into a function based on a gear ratio of the planetary gear mechanism 231. That is, the estimation output torque of the HMT 230 is obtained by adding a torque value due to mechanical transmission obtained by multiplying the torque applied to the input shaft of the HMT 230 obtained by subtracting an amount of the PTO torque from the engine output torque by the gear ratio and the torque of the HST motor 2322.

The assist correction value calculation unit 324 calculates a correction value of an output target rotation speed for realizing the torque assist based on a difference between the estimation output torque calculated by the output torque estimation unit 323 and the target output torque decided by the distribution decision unit 321. Specifically, the assist correction value calculation unit 324 first calculates assist torque required to realize the target output torque by subtracting the estimation output torque from the target output torque. At this time, the assist correction value calculation unit 324 restricts the assist torque to a value equal to or less than a predetermined assist torque upper limit value. The assist torque upper limit value is a torque upper limit value obtained in advance for suppressing the occurrence of overload due to excessive relief of the HST 232. Then, the assist correction value calculation unit 324 calculates the correction value of the output target rotation speed by multiplying the assist torque by a predetermined gain and integrating the multiplied value.

The target output rotation speed decision unit 325 estimates the rotation speed of the output shaft of the HMT 230 after the lapse of time related to a predetermined control cycle, and decides a value obtained by adding the correction value calculated by the assist correction value calculation unit 324 to the estimated rotation speed, as a target rotation speed of the output shaft of the HMT 230, based on the measurement value of the rotation speed of the output shaft of the HMT 230, the traveling load torque estimated by the travel load estimation unit 316, and the target HMT torque decided by the distribution decision unit 321.

The target input rotation speed decision unit 326 estimates the rotation speed of the input shaft of the HMT 230 after the lapse of time related to a predetermined control cycle and decides the estimated value as the target rotation speed of the input shaft of the HMT 230, based on the measurement value of the rotation speed of the input shaft of the HMT 230 and the target engine acceleration specified by the acceleration torque specifying unit 318.

The target speed ratio decision unit 327 divides the target rotation speed of the output shaft decided by the target output rotation speed decision unit 325 by the target rotation speed of the input shaft decided by the target input rotation speed decision unit 326 to decide a target input-output speed ratio of the HMT 230.

The transmission control unit 328 outputs the capacity command of the HST pump 2321 and the HST motor 2322 in order to realize the target input-output speed ratio decided by the target speed ratio decision unit 327.

(Control Method for Work Vehicle)

Figure 5:
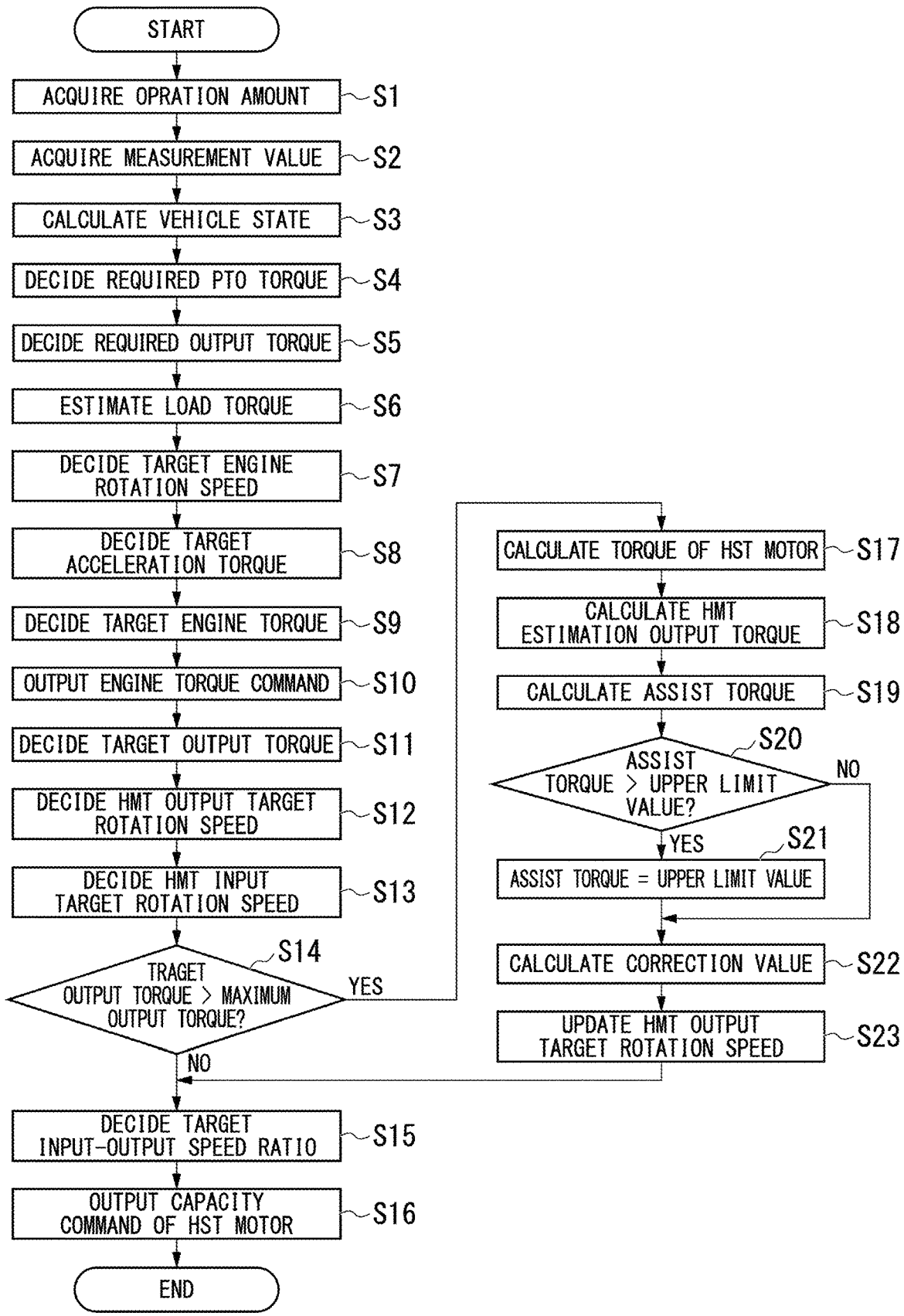
FIG. 5 is a flowchart showing a control method for the work vehicle according to the first embodiment.

FIG. 5 is a flowchart showing a control method for the work vehicle according to the first embodiment.

First, the operation amount acquisition unit 311 acquires the operation amount from each of the accelerator pedal 152, the brake pedal 153, the steering wheel 154, the front/rear selector switch 155, the shift switch 156, the boom lever 157, and the bucket lever 158 (step S1). In addition, the measurement value acquisition unit 312 acquires the measurement values from the fuel injection device 211, the engine tachometer 2101, the input shaft tachometer 2301, the output shaft tachometer 2302, the HST pressure gauge 2303, the first pump pressure gauge 2601, the pump capacity meter 2602, and the second pump pressure gauge 2701 (step S2).

Next, the vehicle state calculation unit 313 calculates the output torque of the engine 210, the upper limit torque of the engine 210, the angular acceleration of the engine 210, the PTO torque, the input-output speed ratio of the HMT 230, the angular acceleration of the output shaft of the HMT 230, and the traveling speed of the work vehicle 100, based on the measurement value acquired in step S2 (step S3).

The required PTO torque decision unit 314 decides the required PTO torque based on the steering operation amount, the boom operation amount, and the bucket operation amount acquired in step S1 the pump pressure and the capacity of the variable capacity pump 260 and the measurement value of the pump pressure of the fixed capacity pump 270 acquired in step S2 (step S4). The required output torque decision unit 315 decides the required output torque based on the operation amount related to traveling acquired in step S1 and the traveling speed calculated in step S3 (step S5). The travel load estimation unit 316 estimates the traveling load torque based on a value of a vehicle state calculated in step S3 (step S6).

The target engine rotation speed decision unit 317 decides a target engine rotation speed based on a required traveling power calculated from the required output torque and the traveling speed and a required engine output, which is a sum of the required PTO torque and a required PTO output calculated from the measurement value of the rotation speed of the engine 210 (step S7). The acceleration torque specifying unit 318 specifies the target engine acceleration based on the measurement value of the rotation speed of the engine 210 and the target engine rotation speed decided in step S7 and calculates the target acceleration torque based on the specified target engine acceleration (step S8). The target engine torque decision unit 319 decides the target engine torque based on the required output torque, the PTO torque, the upper limit torque of the engine, the input-output speed ratio of the HMT 230 calculated in step S3, and the measurement value of the rotation speed of the engine 210 acquired in step S2 (step S9). The engine control unit 320 outputs the engine torque command indicating the target engine torque decided in step S9 (step S10).

Next, the distribution decision unit 321 decides the target PTO torque and the target output torque based on the required PTO torque decided in step S4 and the required output torque decided in step S5 (step S11). In addition, the distribution decision unit 321 decides target output torque, which is a target value of the torque of the output shaft of the HMT 230, based on the decided target HMT torque, the input-output speed ratio of the HMT 230, and the efficiency of the HMT 230.

The target output rotation speed decision unit 325 decides the target rotation speed of the output shaft of the HMT 230 based on the measurement value of the rotation speed of the output shaft of the HMT 230 acquired in step S2, the traveling load torque estimated in step S6, and the target output torque decided in step S11 (step S12). The target input rotation speed decision unit 326 decides the target rotation speed of the input shaft of the HMT 230 based on the measurement value of the rotation speed of the input shaft of the HMT 230 acquired in step S2 and the target engine acceleration specified in step S8 (step S13).

Next, the torque assist determination unit 322 determines whether or not the target output torque decided in step S11 is larger than the torque at the time of non-relief of the HMT 230 calculated in advance, that is, the maximum output torque of the relief set pressure (step S14). In a case in which the target output torque is equal to or less than the maximum output torque at the time of non-relief (step S14: NO), the torque assist determination unit 322 determines not to perform the torque assist. In a case in which the torque assist is not performed, the target speed ratio decision unit 327 decides the target input-output speed ratio of the HMT 230 by dividing the target rotation speed of the output shaft decided in step S12 by the target rotation speed of the input shaft decided in step S13 (step S15). Then, the transmission control unit 328 outputs the capacity command of the HST pump 2321 and the HST motor 2322 in order to realize the target input-output speed ratio decided in step S15 (step S16).

On the other hand, in a case in which the target output torque is larger than the maximum output torque at the time of non-relief (step S14: YES), the torque assist determination unit 322 determines to perform the torque assist. In a case in which the torque assist is performed, the output torque estimation unit 323 calculates the torque of the HST motor 2322 from the pressure of the HST 232 acquired in step S2 and the capacity command of the HST motor 2322 (step S17). The output torque estimation unit 323 calculates the estimation output torque of the HMT 230 by substituting the calculated torque of the HST motor 2322 and the output torque of the engine 210 calculated in step S3 into the function based on the gear ratio of the planetary gear mechanism 231 (step S18).

The assist correction value calculation unit 324 calculates the required assist torque by subtracting the estimation output torque calculated in step S18 from the target output torque decided in step S11 (step S19). The assist correction value calculation unit 324 determines whether or not the calculated assist torque is larger than the assist torque upper limit value (step S20). In a case in which the calculated assist torque is larger than the assist torque upper limit value (step S20: YES), the assist correction value calculation unit 324 rewrites the assist torque value to the assist torque upper limit value (step S21). In a case in which the assist torque is equal to or less than the assist torque upper limit value (step S20: NO), or in a case in which the assist torque value is rewritten, the assist correction value calculation unit 324 multiplies the assist torque by the predetermined gain and integrates the multiplied value to calculate the correction value of the output target rotation speed (step S22). The target output rotation speed decision unit 325 updates the target rotation speed of the output shaft by adding the correction value calculated in step S22 to the target rotation speed of the output shaft decided in step S12 (step S23).

Then, the target speed ratio decision unit 327 decides the target input-output speed ratio of the HMT 230 by dividing the target rotation speed of the output shaft decided in step S13 by the target rotation speed of the input shaft decided in step S23 (step S15). The transmission control unit 328 outputs the capacity command of the HST pump 2321 and the HST motor 2322 in order to realize the target input-output speed ratio decided in step S15 (step S16).

The control device 300 executes the control process described above at each predetermined control cycle.

Operation and Effect

As described above, the control device 300 according to the first embodiment generates the control signal of the HMT 230 such that the hydraulic power converted by the HST pump 2321 out of the power from the engine 210 exceeds the power absorbed by the HST motor 2322. As a result, the control device 300 can increase the traction force of the work vehicle 100 by an amount of the assist torque due to the relief of the HMT 230. That is, the control device 300 enables the HMT 230 to exert high traction force without increasing the size of the hydraulic transmission device configuring the HST 232.

In addition, the control device 300 according to the first embodiment generates the control signal for realizing the torque assist in the HMT 230 in a case in which the target traction force of the output shaft of the HMT 230 is larger than the traction force that the HMT 230 is capable of exerting. As a result, the control device 300 realizes the torque assist due to the relief only in the minimum necessary case. Therefore, the control device 300 can reduce the chance that the relief of HST 232 is generated.

Second Embodiment

The work vehicle 100 according to the first embodiment includes the HMT 230 as the power transmission device. On the other hand, the work vehicle 100 according to a second embodiment includes an electric mechanical transmission (EMT) 280 as the power transmission device.

(Configuration of EMT)

Figure 6:
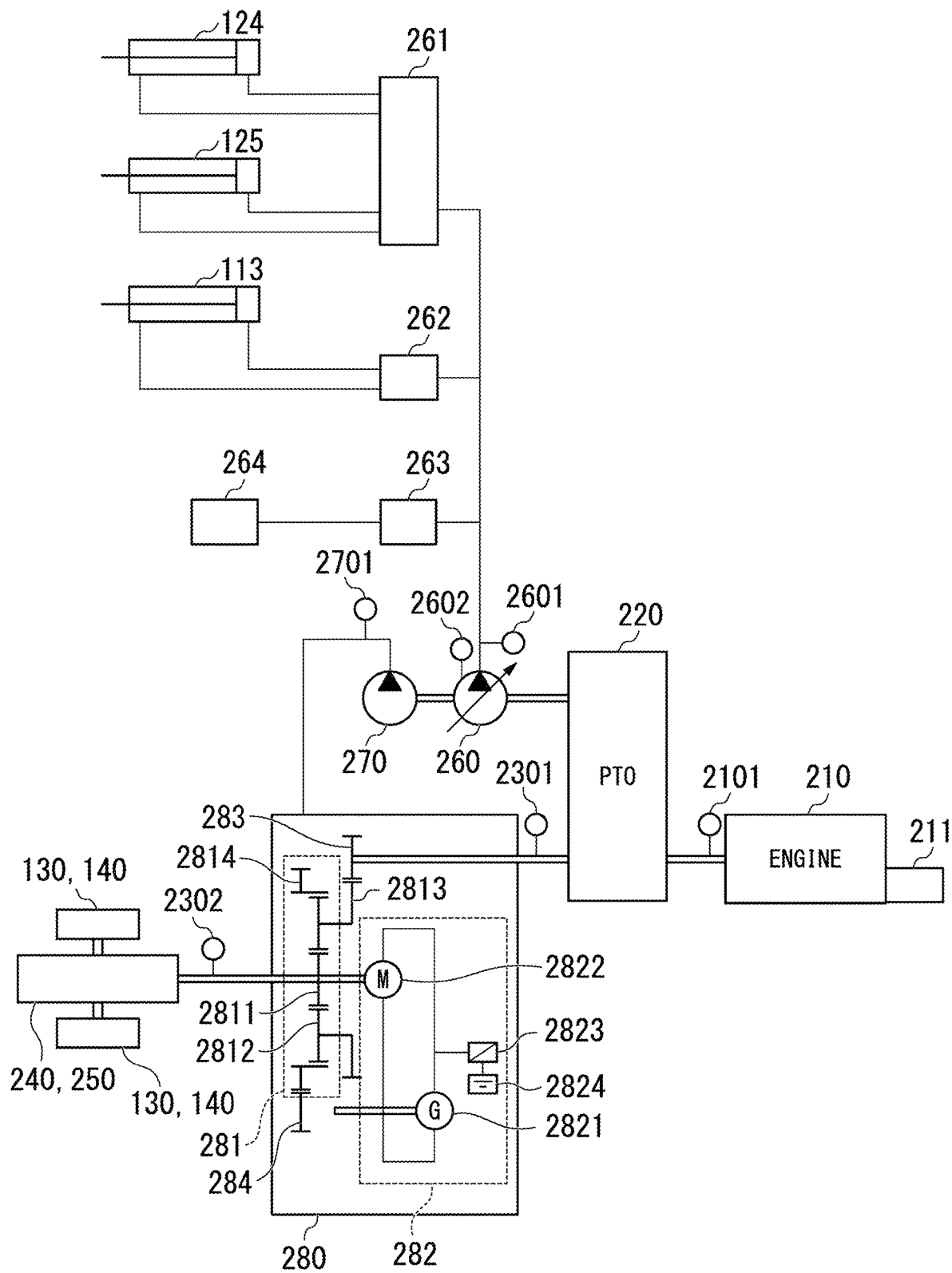
FIG. 6 is a schematic diagram showing a power system of a work vehicle according to a second embodiment.

FIG. 6 is a schematic diagram showing a power system of the work vehicle according to the second embodiment.

The EMT 280 includes a planetary gear mechanism 281, an electric continuously variable transmission device 282, an input shaft gear 283, and a power generator gear 284.

The input shaft gear 283 is connected to the input shaft of the EMT 280.

The power generator gear 284 is connected to the input shaft of the electric continuously variable transmission device 282.

The planetary gear mechanism 281 includes a sun gear 2811, a plurality of planetary gears 2812, a carrier 2813, and a ring gear 2814. The sun gear 2811, the carrier 2813, and the ring gear 2814 are rotation elements of the planetary gear mechanism 281. Note that the planetary gear mechanism 281 is an example of the differential device.

The sun gear 2811 is disposed at the center of the planetary gear mechanism 281. The output shaft of the EMT 280 is connected to a rotation shaft of the sun gear 2811.

The planetary gear 2812 is fitted to the outer circumference of the sun gear 2811.

The carrier 2813 rotatably supports central axes of the plurality of planetary gears 2812.

The ring gear 2814 has teeth on an inner circumference thereof fitted to the outer circumferences of the plurality of planetary gears 2812. Teeth of the ring gear 2814 on an outer circumference thereof are fitted to the power generator gear 284.

The electric continuously variable transmission device 282 includes a power generator 2821, a motor 2822, an inverter 2823, and a storage battery 2824. The electric continuously variable transmission device 282 is an example of the continuously variable transmission unit.

The power generator 2821 is driven by the power of the carrier 2813 of the planetary gear mechanism 281 via the power generator gear 284. The power generator 2821 supplies the generated electric power to the motor 2822. That is, the power generator 2821 is an example of the conversion unit that converts the rotational power into the electric power.

The motor 2822 is driven by the electric power supplied from the power generator 2821. The motor 2822 provides the power to the sun gear 2811. That is, the motor 2822 is an example of a reconversion unit which reconverts the electric power into the rotational power.

The inverter 2823 boosts a part of the current flowing between the power generator 2821 and the motor 2822 and supplies the boosted current to the storage battery 2824.

The storage battery 2824 is connected to the inverter 2823 to be charged by the electric power supplied from the inverter 2823. The storage battery 2824 is an example of a load that consumes a part of the electric power generated by the power generator 2821.

The EMT 280 according to the second embodiment has an input division type configuration similar to the HMT 230 of the first embodiment.

(Control Device)

In the control device 300 according to the second embodiment, the operation of the transmission control unit 328 is different from that in the first embodiment. That is, in order to realize the assist torque calculated by the assist correction value calculation unit 324, the transmission control unit 328 outputs a charge command for the storage battery 2824 to the inverter 2823. As a result, a part of the electric power generated by the power generator 2821 is supplied to the storage battery 2824, so that the electric power generated by the power generator 2821 is larger than the electric power supplied to the motor 2822. As a result, the torque of the input shaft of the power generator 2821 is increased, and the input torque of the planetary gear mechanism 281 is increased. As a result, it is possible to increase the torque of the output shaft of the EMT 280 connected to the planetary gear mechanism 281.

Operation and Effect

As described above, the control device 300 according to the second embodiment generates the control signal of the EMT 280 such that the electric power generated by the power generator 2821 exceeds the electric power input to the motor 2822. As a result, the control device 300 can increase the traction force of the work vehicle 100 by an amount of the assist torque due to the discharge of the EMT 280. That is, the control device 300 enables the EMT 280 to exert high traction force without increasing the size of the power generator 2821 and the motor 2822.

Note that in another embodiment, the EMT 280 may include a load that consumes the electric power as heat energy, such as a resistor, instead of the storage battery 2824.

Although the embodiments have been described in detail with reference to the drawings, a specific configuration is not limited to the above, and various design changes and the like can be made. For example, in another embodiment, order of the processes described above may be changed as appropriate. Also, some processes may be executed in parallel.

In the embodiments described above, the control device 300 corrects the output target rotation speed of the power transmission device in order to realize the assist torque, but the present invention is not limited thereto. For example, in another embodiment, the control device 300 may correct other parameters in order to realize the assist torque by multiplying the target input-output speed ratio by a coefficient.

In addition, the work vehicle 100 according to the first embodiment is a wheel loader, but the present invention is not limited thereto. For example, the work vehicle 100 according to another embodiment may be another work vehicle 100, such as a bulldozer and a tractor. Also, in another embodiment, the control device 300 may be applied to a power machine other than the work vehicle.

According to the above disclosure of the present invention, the control device of the power transmission device enables the composite power transmission device to exert high traction force.

The invention claimed is:

1. A control device of a power transmission device that includes
an input shaft,
an output shaft,
a differential device including
a first rotation element connected to the input shaft,
a second rotation element connected to the output shaft, and
a third rotation element, and
a continuously variable transmission unit including
a conversion unit configured to convert a first rotational power of the third rotation element into a first other power and
a reconversion unit configured to reconvert a second other power into a second rotational power and supply the second rotational power to the output shaft,
the control device comprising:
a continuously variable transmission control unit configured to
determine whether a target traction force of the output shaft is larger than a traction force that the power transmission device is capable of exerting, and
upon determining that the target traction force is larger than the traction force that the power transmission device is capable of exerting, generate a control signal of the continuously variable transmission unit such that the first other power generated by the conversion unit exceeds the second other power input to the reconversion unit.

2. The control device of the power transmission device according to claim 1, wherein
each of the first other power and the second other power is hydraulic power,
the continuously variable transmission unit includes a relief valve configured to discharge a hydraulic oil such that a pressure of the hydraulic oil supplied from the conversion unit to the reconversion unit is equal to or less than a predetermined relief pressure, and
the control signal is configured to cause the conversion unit to discharge the hydraulic oil at a pressure exceeding the relief pressure such that the first other power exceeds the second other power.

3. The control device of the power transmission device according to claim 1, wherein
the other power is electric power,
the continuously variable transmission unit includes a load connected to the conversion unit in parallel with the reconversion unit, and
the control signal configured to cause the load to consume a part of the electric power output by the conversion unit such that the first other power exceeds the second other power.

4. The control device of the power transmission device according to claim 1, wherein
the control device is configured to calculate a correction value of an output target rotation speed of the power transmission device based on a difference between an estimation output torque of the power transmission device and a target output torque, the target output torque being a target value of a torque of the output shaft of the power transmission device.

5. The control device of the power transmission device according to claim 4, wherein
the control device is configured to restrict an assist torque to a value equal to or less than a predetermined assist torque upper limit value, the assist torque being required to realize the target output torque.

6. The control device of the power transmission device according to claim 5, wherein
the assist torque upper limit value is a torque upper limit value obtained in advance for suppressing the occurrence of overload due to excessive relief of the continuously variable transmission unit.

7. A power transmission device comprising:
an input shaft;
an output shaft;
a differential device including
a first rotation element connected to the input shaft,
a second rotation element connected to the output shaft, and
a third rotation element;
a continuously variable transmission unit including
a conversion unit configured to convert a first rotational power of the third rotation element into a first other power and
a reconversion unit configured to reconvert a second other power into a second rotational power and supply the second rotational power to the output shaft; and
a control device configured to
determine whether a target traction force of the output shaft is larger than a traction force that the power transmission device is capable of exerting, and
upon determining that the target traction force is larger than the traction force that the power transmission device is capable of exerting, generate a control signal of the continuously variable transmission unit such that the first other power generated by the conversion unit exceeds the second other power input to the reconversion unit.

8. A control method for a power transmission device that includes
an input shaft,
an output shaft,
a differential device including
a first rotation element connected to the input shaft,
a second rotation element connected to the output shaft, and
a third rotation element, and
a continuously variable transmission unit including
a conversion unit configured to convert a first rotational power of the third rotation element into a first other power and
a reconversion unit configured to reconvert a second other power into a second rotational power and supply the second rotational power to the output shaft,
the method comprising:
determining whether a target traction force of the output shaft is larger than a traction force that the power transmission device is capable of exerting, and
upon determining that the target traction force is larger than the traction force that the power transmission device is capable of exerting, generating a control signal of the continuously variable transmission unit such that the first other power generated by the conversion unit exceeds the second other power input to the reconversion unit.

* * * * *